US012439923B1

(12) United States Patent
Yin

(10) Patent No.: US 12,439,923 B1
(45) Date of Patent: Oct. 14, 2025

(54) MATERIAL FOR PRODUCING MACROMOLECULE AIR FIBERS, PREPARATION METHOD, AND APPLICATION

(71) Applicant: Hui Yin, Hengyang (CN)

(72) Inventor: Hui Yin, Hengyang (CN)

( * ) Notice: Subject to any disclaimer, the term of this patent is extended or adjusted under 35 U.S.C. 154(b) by 0 days.

(21) Appl. No.: 19/084,709

(22) Filed: Mar. 19, 2025

(30) Foreign Application Priority Data

Sep. 14, 2024 (CN) ........................ 202411291916.7

(51) Int. Cl.

| | |
|---|---|
| ***A01N 59/16*** | (2006.01) |
| ***A01N 25/34*** | (2006.01) |
| ***A01P 1/00*** | (2006.01) |
| ***C08J 3/21*** | (2006.01) |
| ***C08K 3/22*** | (2006.01) |
| ***C08K 9/04*** | (2006.01) |
| ***C08L 5/00*** | (2006.01) |
| ***C09C 1/36*** | (2006.01) |

(Continued)

(52) U.S. Cl.

CPC ............ *A01N 59/16* (2013.01); *A01N 25/34* (2013.01); *A01P 1/00* (2021.08); *C08J 3/212* (2013.01); *C08K 3/22* (2013.01); *C08K 9/04* (2013.01); *C08L 5/00* (2013.01); *C09C 1/36* (2013.01); *C09C 3/003* (2013.01); *C09C 3/006* (2013.01); *C09C 3/041* (2013.01); *C09C 3/043* (2013.01); *C09C 3/06* (2013.01); *C09C 3/08* (2013.01); *D04H 1/413* (2013.01); *D04H 1/435* (2013.01); *D04H 1/56* (2013.01); *D04H 1/732* (2013.01); *C01P 2002/54* (2013.01); *C01P 2006/42* (2013.01); *C08J 2305/00* (2013.01); *C08J 2367/02* (2013.01); *C08K 2201/01* (2013.01); *D10B 2331/04* (2013.01); *D10B 2401/13* (2013.01); *D10B 2503/06* (2013.01)

(58) Field of Classification Search

CPC ...... D10B 2331/04; D04H 1/435; D04H 1/56; D04H 1/565; C08J 2367/02; C08J 3/212; C08K 9/04; C08K 3/22; C08L 67/02

See application file for complete search history.

(56) References Cited

FOREIGN PATENT DOCUMENTS

| | | | |
|---|---|---|---|
| CN | 108842217 | A | 11/2018 |
| CN | 117230541 | A | 12/2023 |

(Continued)

*Primary Examiner* — Kregg T Brooks

(74) *Attorney, Agent, or Firm* — Birchwood IP

(57) ABSTRACT

A material for producing macromolecule air fibers, a preparation method, and an application thereof are provided. The material for producing macromolecule air fiber is prepared by preparation of doped antibacterial $TiO_2/ZnO/ZrO_2$ ceramic powder, deposition of magnetic iron oxide, surface modification with tannic acid, addition of water-soluble chitosan solution, immersion in a spined TPEE air fiber membrane, uniform addition of Genipin solution, heating and reacting, membrane removal, washing, and drying. The TPEE air fiber membrane produced by the present disclosure has good mechanical properties, and modified ceramic powder is uniformly dispersed in the TPEE air fiber membrane, which plays a good role in antibacterial, environmental protection, immune regulation, magnetic therapy, far-infrared heating and other effects, rendering the material for producing macromolecule air fibers have better comprehensive performance and a good mattress support material with broad application prospects.

9 Claims, 1 Drawing Sheet

(51) Int. Cl.

| | |
|---|---|
| ***C09C 3/00*** | (2006.01) |
| ***C09C 3/04*** | (2006.01) |
| ***C09C 3/06*** | (2006.01) |
| ***C09C 3/08*** | (2006.01) |
| ***D04H 1/413*** | (2012.01) |
| ***D04H 1/435*** | (2012.01) |
| ***D04H 1/56*** | (2006.01) |
| ***D04H 1/732*** | (2012.01) |

(56) References Cited

FOREIGN PATENT DOCUMENTS

| | | |
|---|---|---|
| CN | 117924886 A | 4/2024 |
| CN | 118127817 B | 6/2024 |

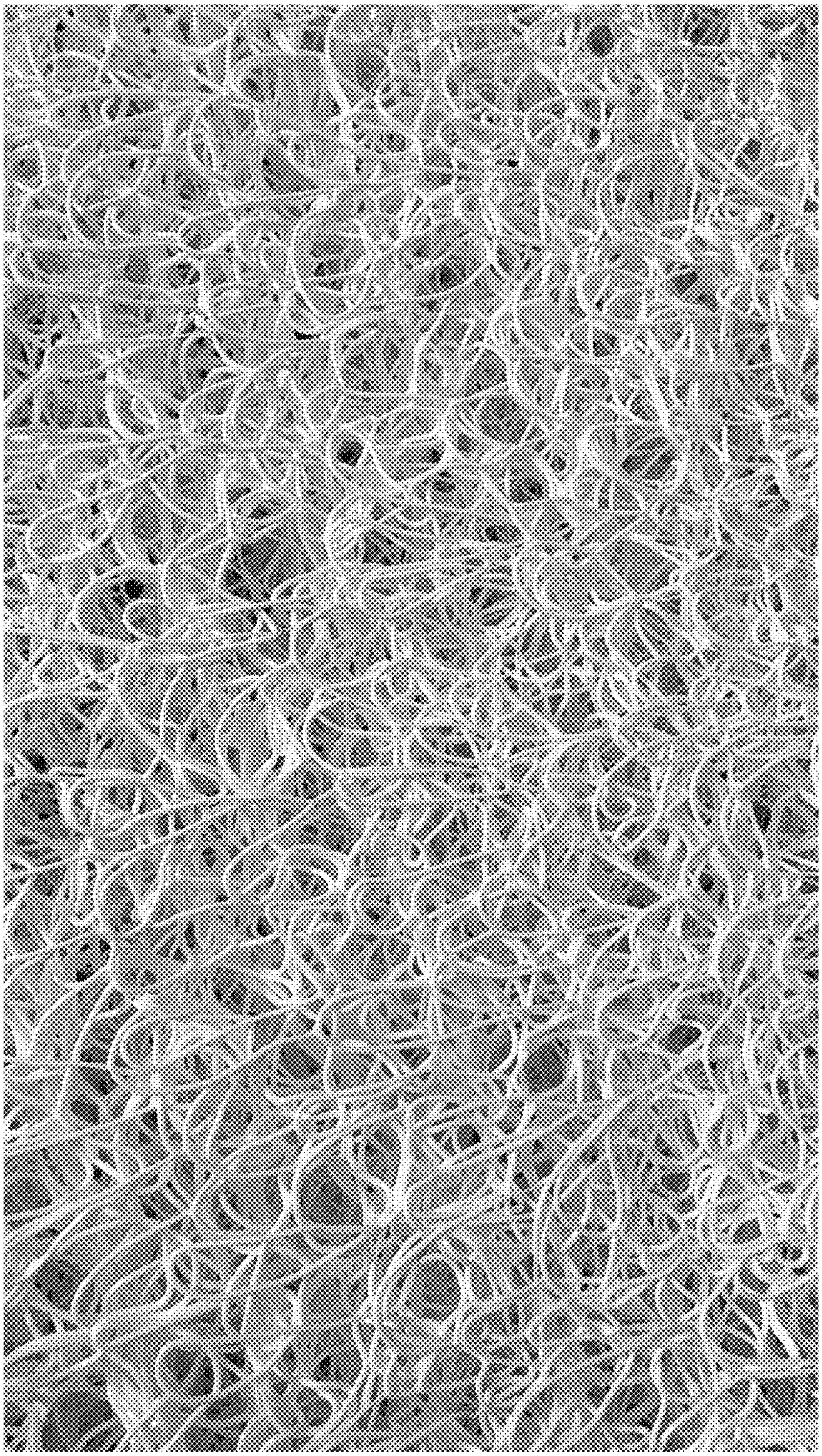

MATERIAL FOR PRODUCING MACROMOLECULE AIR FIBERS, PREPARATION METHOD, AND APPLICATION

CROSS-REFERENCE TO RELATED APPLICATIONS

This application claims priority to Chinese Patent Application No. 202411291916.7, filed on Sep. 14, 2024, which is hereby incorporated by reference in its entirety.

TECHNICAL FIELD

The present disclosure relates to the field of home furnishing technologies, and in particular, to a material for producing macromolecule air fibers, a preparation method, and an application thereof.

BACKGROUND

The softness and hardness of a mattress can affect sleep quality and are important indicators for evaluating mattress comfort. Both softness and hardness can cause discomfort after waking up and even affect the user's physical health. Macromolecule air fiber is a new type of mattress material with various characteristics and advantages. According to search results, air fiber mattresses are usually made of macromolecule materials, which form a 3D fiber woven structure. Air fiber mattress is a modern sleep solution that combines comfort, support, and ease of cleaning to provide the user with a healthy and comfortable sleeping environment. The main advantages of this mattress include the following.

1. Good breathability and strong support: due to its special structure, air fiber mattresses have good breathability and provide sufficient support, making sleep more comfortable. The breathability of this mattress helps to keep it dry, reduces the feeling of dampness and stuffiness, and also helps to reduce the breeding of mites.
2. Washable cleaning: compared to traditional mattresses, air fiber mattresses can be directly rinsed with water, rendering cleaning the mattress more convenient and effectively removing stains and allergens.
3. Adjustable hardness: some air fiber mattresses are designed with different hardness zones, allowing the user to adjust the hardness of the mattress according to his preferences and physical needs to achieve a best sleep experience.
4. Environmentally friendly materials: air fiber mattresses are usually made of environmentally friendly materials that do not contain substances that may cause allergies such as formaldehyde and latex, rendering them a better choice for people with allergies.
5. Lightweight and easy to transport: due to the special nature of the material, air fiber mattresses are usually lighter than traditional mattresses, rendering them easier to transport and place.
6. Suitable for specific populations: air fiber mattresses are particularly suitable for teenagers with developing bones, those with lower back and spine discomfort or poor sleep quality, as well as the user who prefers hard mattresses.

However, the preparation process of the macromolecule air fiber is complex, with strict conditions, which can easily lead to product quality issues, high costs, insufficient mechanical durability, and long-term use, rendering it prone to collapse and other problems.

SUMMARY

The purpose of the present disclosure is to propose a material for producing macromolecule air fibers, a preparation method, and an application thereof. The material has good mechanical properties, and modified ceramic powder is uniformly dispersed in the TPEE air fiber membrane, which plays a good role in antibacterial, environmental protection, immune regulation, magnetic therapy, far-infrared heating and other effects, rendering the material for producing macromolecule air fibers have better comprehensive performance and a good mattress support material with broad application prospects.

The technical solution of the present disclosure is implemented as follows:

The present disclosure provides a method for preparing a material for producing macromolecule air fibers, which involves preparation of doped antibacterial $TiO_2/ZnO/ZrO_2$ ceramic powder, deposition of magnetic iron oxide, surface modification with tannic acid, addition of water-soluble chitosan solution, immersion in a spined TPEE air fiber membrane, uniform dropwise addition of Genipin solution, heating and reacting, membrane removal, washing, and drying.

In some embodiments of the present disclosure, the preparation method for a material for producing macromolecule air fibers, including the following steps:

S1: preparation of doped antibacterial far-infrared ceramic powder: adding tetrabutyl titanate, zinc acetate, and zirconium acetate to ethanol, adding polyvinyl alcohol and thiocarbamide, stirring and mixing evenly, adding hydrochloric acid dropwise, stirring and reacting, centrifuging, washing, drying, calcining, and ball milling to obtain the doped antibacterial far-infrared ceramic powder;

S2: preparation of magnetic doped antibacterial far-infrared ceramic powder: adding the doped antibacterial far-infrared ceramic powder to water, adding ferric chloride and ferrous chloride under inert gas protection, adding ammonia water dropwise, heating, stirring and reacting, centrifuging, washing, drying, and calcining to obtain the magnetic doped antibacterial far-infrared ceramic powder;

S3: preparation of modified ceramic powder: adding the magnetic doped antibacterial far-infrared ceramic powder to water, adding tannic acid and catalyst, heating, stirring and reacting, separating by magnet, washing, drying to obtain the modified ceramic powder;

S4: melt spraying: adding TPEE to a screw injection molding machine, heating, melting and spraying, and then stretching under an action of hot air, after being pulled by a stretching airflow, blown towards a drum and collected on the drum, and synthesized into TPEE air fiber membrane by its own thermal adhesion;

S5: preparation of the material for producing macromolecule air fibers: dissolving water-soluble chitosan in water, adding the modified ceramic powder, stirring and mixing evenly, immersing in TPEE air fiber membrane, evenly dropping Genipin solution, heating and reacting, removing the membrane, washing, drying, and preparing the material for producing macromolecule air fibers.

In some embodiments of the present disclosure, a mass ratio of tetrabutyl titanate, zinc acetate, zirconium acetate, polyvinyl alcohol, and thiocarbamide in step S1 is 10-13: 3-5:2-4:0.5-1:0.2-0.4, the hydrochloric acid has a concentration of 1.5-2.5 mol/L, a temperature of the calcining is 400-600° C., and a time of the calcining is 2-3 hours, and a time for the ball milling is 1-2 hours.

In some embodiments of the present disclosure, a mass ratio of the doped antibacterial far-infrared ceramic powder, ferric chloride, ferrous chloride, and ammonia water in step S2 is 10-12:3.24:1.26:4-6; a temperature of the heating, stirring and reacting is 70-80° C. and a time of the heating, stirring and reacting is 3-5 hours; a temperature of the calcining is 400-500° C., and a time of the calcining is 1-2 hours.

In some embodiments of the present disclosure, a mass ratio of the magnetic doped antibacterial far-infrared ceramic powder, tannic acid and catalyst in step S3 is 10:3-4:0.5-1; the catalyst is a Tris HCl solution with a pH of 8.5-9.5; a temperature of the heating, stirring and reacting is 35-45° C., and a time of the heating, stirring and reacting is 2-4 hours.

In some embodiments of the present disclosure, a temperature of the melting in step S4 is 205-215° C.

In some embodiments of the present disclosure, in step S5, the water-soluble chitosan is carboxymethyl chitosan or chitosan hydrochloride; a mass ratio of the water-soluble chitosan, modified ceramic powder, and TPEE air fiber membrane is 7-10:2-3:15-20; the Genipin solution has a concentration of 0.1-0.2 wt %; a temperature of the heating and reacting is 35-45° C., and a time of the heating and reacting is 1-2 hours.

In some embodiments of the present disclosure, the preparation method according to claim 1, including the following steps:

S1: preparation of doped antibacterial far-infrared ceramic powder: adding 10-13 parts by weight of tetrabutyl titanate, 3-5 parts by weight of zinc acetate, and 2-4 parts by weight of zirconium acetate to ethanol, adding 0.5-1 parts by weight of polyvinyl alcohol and 0.2-0.4 parts by weight of thiocarbamide, stirring and mixing evenly, adding 10-12 parts by weight of 1.5-2.5 mol/L hydrochloric acid solution dropwise, stirring and reacting for 3-5 hours, centrifuging, washing, drying, calcining at 400-600° C. for 2-3 hours, ball milling for 1-2 hours to prepare the doped antibacterial far-infrared ceramic powder;

S2: preparation of magnetic doped antibacterial far-infrared ceramic powder: adding 10-12 parts by weight of doped antibacterial far-infrared ceramic powder to water, adding 3.24 parts by weight of ferric chloride and 1.26 parts by weight of ferrous under inert gas protection, adding 4-6 parts by weight of ammonia water dropwise, heating to 70-80° C., stirring for 3-5 hours, centrifuging, washing, drying, and calcining at 400-500° C. for 1-2 hours to prepare the magnetic doped antibacterial far-infrared ceramic powder;

S3: preparation of modified ceramic powder: adding 10 parts by weight of magnetic doped antibacterial far-infrared ceramic powder to water, adding 3-4 parts by weight of tannic acid and 0.5-1 parts by weight of catalyst, heating to 35-45° C., stirring for 2-4 hours, separating by magnet, washing, and drying to obtain the modified ceramic powder;

where the catalyst is a Tris HCl solution with a pH of 8.5-9.5;

S4: melt spraying: adding TPEE to a screw injection molding machine, heating to 205-215° C., melting and spraying, stretching under an action of hot air, after being pulled by a stretching airflow, it is blown towards a drum, and collected on the drum, then synthesized into TPEE air fiber membrane by its own thermal adhesion;

S5: preparation of the material for producing macromolecule air fibers: dissolving 7-10 parts by weight of water-soluble chitosan in water, adding 2-3 parts by weight of the modified ceramic powder, stirring and mixing evenly, immersing 15-20 parts by weight of TPEE air fiber membrane, evenly dripping 10 parts by weight of 0.1-0.2 wt % Genipin solution, heating to 35-45° C., reacting for 1-2 hours, removing the membrane, washing, drying, and preparing the material for producing macromolecule air fibers.

The present disclosure further provides a material for producing macromolecule air fibers prepared by the above-mentioned preparation method.

The present disclosure further provides an application of the material for producing macromolecule air fibers as described above in in preparation of a mattress.

The present disclosure has the following beneficial effects:

TPEE air fiber is a 3D three-dimensional mesh fiber structure material. The raw material thermoplastic polyester elastomer is formed by heating and extruding in water, which has good elasticity and breathability. It can be directly combined with the fabric layer to form a mattress, and can also be used as a mattress cushion layer, which helps to achieve good sleep quality.

The present disclosure prepares the material for producing macromolecule air fibers, using TPEE thermoplastic polyester elastomer (linear block copolymer) as the material to produce TPEE air fiber membrane by melting spraying. The fiber film has a large specific surface area, and the produced TPEE air fiber membrane has good mechanical properties, high elasticity, and high rigidity maintenance for long-term use, which significantly improves the comfort of the produced mattress.

In the present disclosure, doped antibacterial $TiO_2/ZnO/ZrO_2$ ceramic powder is prepared by sol gel reaction. By adding thiocarbamide and calcining, the prepared $TiO_2/ZnO/ZrO_2$ ceramic powder is doped with C, N and S elements. The doping of these non-metallic elements changes the crystal structure of $TiO_2$ and ZnO, and can also inhibit a recombination rate of photogenerated electrons and holes. Compared with pure $TiO_2$ and ZnO, the photocatalytic activity is significantly enhanced, thereby solving corresponding defects of photocatalyst $TiO_2$ and ZnO only in the ultraviolet light region, greatly expanding its application, and making the prepared doped antibacterial $TiO_2/ZnO/ZrO_2$ ceramic powder can catalyze the degradation of pollutants such as formaldehyde under the action of visible light, making the mattress more environmentally friendly. At the same time, it also has better antibacterial performance, rendering the mattress have more hygienic and safer. At the same time, the produced $TiO_2/ZnO/ZrO_2$ ceramic powder has a certain far-infrared emission function, which can slowly generate heat, rendering the user feel comfortable and at ease when using the mattress.

The deposition of magnetic iron oxide on the surface of $TiO_2/ZnO/ZrO_2$ ceramic powder can improve sleep status, promote sleep and prolong sleep time by forming a magnetic field. It can also alleviate muscle spasms, reduce muscle tone, and regulate immunity.

The surface of the prepared magnetic doped antibacterial far-infrared ceramic powder is modified with tannic acid to make the particle surface adhesive, with rich hydroxyl and other functional groups, which can be fixed on chitosan through hydrogen bonding with amino and carboxyl groups of chitosan. The water-soluble chitosan is penetrated on the TPEE air fiber membrane and crosslinks and adsorbs on the TPEE air fiber membrane under the action of Genipin, thereby enhancing the mechanical properties of the TPEE air fiber membrane. The modified ceramic powder is uniformly dispersed in the TPEE air fiber membrane, thereby playing a good role in antibacterial, environmental protection, immune regulation, magnetic therapy, far-infrared heating, etc., rendering the material for producing macromolecule air fibers have better comprehensive performance. It is a good mattress support material with broad application prospects.

BRIEF DESCRIPTION OF DRAWINGS

In order to provide a clearer explanation of the embodiments of the present disclosure or the technical solutions in the prior art, a brief introduction will be given to the accompanying drawings required for the description of the embodiments or the prior art. It is obvious that the accompanying drawings described below are only some embodiments of the present disclosure. For those skilled in the art, other drawings can be obtained based on these drawings without creative work.

FIG. 1 shows a photograph of a TPEE air fiber membrane produced in Example 1 of the present disclosure.

DESCRIPTION OF EMBODIMENTS

The following will provide a clear and complete description of the technical solutions in the embodiments of the present disclosure. Obviously, the described embodiments are only a part of the embodiments of the present disclosure, and not all of them. Based on the embodiments of the present disclosure, all other embodiments obtained by those skilled in the art without creative work are within the protection scope of the present disclosure.

TPEE is Thermoplastic Polyeher Ester Elastomer, and may be Arnitel® TPEE UM551-V.

Example 1

This embodiment provides a method for preparing a material for producing macromolecule air fibers, which specifically includes the following steps:

S1: preparation of doped antibacterial far-infrared ceramic powder: 10 g tetrabutyl titanate, 3 g zinc acetate, 2 g zirconium acetate were added to 500 mL ethanol, 0.5 g polyvinyl alcohol and 0.2 g thiocarbamide were added, stirred and mixed for 20 minutes, 10 g of 1.5 mol/L hydrochloric acid solution was added dropwise, stirred and reacted for 3 hours, centrifuged, washed, dried, calcined at 400° C. for 2 hours, ball milled for 1 hour to prepare the doped antibacterial far-infrared ceramic powder;

S2: preparation of magnetic doped antibacterial far-infrared ceramic powder: 10 g of doped antibacterial far-infrared ceramic powder was added to 500 mL of water, and 3.24 g of ferric chloride and 1.26 g of ferrous chloride were added under nitrogen protection; 4 g of ammonia water was added dropwise, heated to 70° C., stirred for 3 hours, centrifuged, washed, dried, and calcined at 400° C. for 1 hour to obtain the magnetic doped antibacterial far-infrared ceramic powder;

S3: preparation of modified ceramic powder: 10 g of magnetic doped antibacterial far-infrared ceramic powder was added to 500 ml of water, 3 g of tannic acid and 0.5 g of catalyst were added, heated to 35° C., stirred for 2 hours, separated by magnet, washed, and dried to obtain the modified ceramic powder; the catalyst is a Tris HCl solution with a pH of 8.5;

S4: melt spraying: TPEE was added to a screw injection molding machine, heated to 205° C., melted and sprayed, stretched under an action of hot air, after being pulled by a stretching airflow, blown towards a drum, and collected on the drum, and then synthesized into TPEE air fiber membrane by its own thermal adhesion; FIG. 1 shows a photograph of the produced TPEE air fiber membrane;

S5: preparation of the material for producing macromolecule air fibers: 7 g of carboxymethyl chitosan was dissolved in 500 mL of water, 2 g of modified ceramic powder was added, stirred and mixed for 10 minutes, immersed in 15 g of TPEE air fiber membrane, evenly dripped 10 g of 0.1 wt % Genipin solution, heated to 35° C., reacted for 1 hour, removed the membrane, washed, dried, and prepared the material for producing the macromolecule air fibers.

Example 2

This embodiment provides a method for preparing a material for producing macromolecule air fibers, which specifically includes the following steps:

S1: preparation of doped antibacterial far-infrared ceramic powder: 13 g tetrabutyl titanate, 5 g zinc acetate, and 4 g zirconium acetate were added to 500 mL ethanol, 1 g polyvinyl alcohol and 0.4 g thiocarbamide were added, stirred and mixed for 20 minutes, 12 g 2.5 mol/L hydrochloric acid solution was added dropwise, stirred and reacted for 5 hours, centrifuged, washed, dried, calcined at 600° C. for 3 hours, and ball milled for 2 hours to prepare the doped antibacterial far-infrared ceramic powder;

S2: preparation of magnetic doped antibacterial far-infrared ceramic powder: 12 g of doped antibacterial far-infrared ceramic powder was added to 500 mL of water, and 3.24 g of ferric chloride and 1.26 g of ferrous chloride were added under nitrogen protection; 6 g of ammonia water was added dropwise, heated to 80° C., stirred for 5 hours, centrifuged, washed, dried, and calcined at 500° C. for 2 hours to obtain the magnetic doped antibacterial far-infrared ceramic powder;

S3: preparation of modified ceramic powder: 10 g of magnetic doped antibacterial far-infrared ceramic powder was added to 500 mL of water, 4 g of tannic acid and 1 g of catalyst were added, heated to 45° C., stirred for 4 h, separated by magnet, washed, and dried to obtain the modified ceramic powder; the catalyst is a Tris HCl solution with a pH of 9.5;

S4: melt spraying: TPEE was added to a screw injection molding machine, heated to 215° C., melted and sprayed, stretched under an action of hot air, after being pulled by a stretching airflow, blown towards a drum, and collected on the drum, and then synthesized into TPEE air fiber membrane by its own thermal adhesion;

S5: preparation of the material for producing macromolecule air fibers: 10 g of carboxymethyl chitosan was dissolved in 500 ml of water, 3 g of modified ceramic powder was added, stirred and mixed for 10 minutes, immersed in 20 g TPEE air fiber membrane, evenly dripped 10 g of 0.2 wt % Genipin solution, heated to 45° C., reacted for 2 hours, removed the membrane, washed, dried, and prepared the material for producing the macromolecule air fibers.

Example 3

This embodiment provides a method for preparing a material for producing macromolecule air fibers, which specifically includes the following steps:

S1: preparation of doped antibacterial far-infrared ceramic powder: 11 g tetrabutyl titanate, 4 g zinc acetate, and 3 g zirconium acetate were added to 500 mL ethanol, 0.7 g polyvinyl alcohol and 0.3 g thiocarbamide were added, stirred and mixed for 20 minutes, 11 g 2 mol/L hydrochloric acid solution was added dropwise, stirred and reacted for 4 hours, centrifuged, washed, dried, calcined at 500° C. for 2.5 hours, and ball milled for 1.5 hours to prepare the doped antibacterial far-infrared ceramic powder;

S2: preparation of magnetic doped antibacterial far-infrared ceramic powder: 11 g of doped antibacterial far-infrared ceramic powder was added to 500 mL of water, 3.24 g of ferric chloride and 1.26 g of ferrous chloride were added under nitrogen protection, and 5 g of ammonia water was added dropwise; heated to 75° C., stirred for 4 hours, centrifuged, washed, dried, and calcined at 450° C. for 1.5 hours to obtain the magnetic doped antibacterial far-infrared ceramic powder;

S3: preparation of modified ceramic powder: 10 g of magnetic doped antibacterial far-infrared ceramic powder was added to 500 ml of water, 3.5 g of tannic acid and 0.7 g of catalyst were added, heated to 40° C., stirred for 3 hours, separated by magnet, washed, and dried to obtain the modified ceramic powder; the catalyst is a Tris HCl solution with pH of 9;

S4: melt spraying: TPEE was added to a screw injection molding machine, heated to 210° C., melted and sprayed, stretched under an action of hot air, after being pulled by a stretching airflow, blown towards a drum, and collected on the drum, and then synthesized into TPEE air fiber membrane by its own thermal adhesion;

S5: preparation of the material for producing macromolecule air fibers: 8.5 g of carboxymethyl chitosan was dissolved in 500 mL of water, 2.5 g of modified ceramic powder was added, stirred and mixed for 10 minutes, immersed in 17 g of TPEE air fiber membrane, evenly dripped 10 g of 0.15 wt % Genipin solution, heated to 40° C., reacted for 1.5 hours, removed the membrane, washed, dried, and prepared the material the material for producing the macromolecule air fibers.

Comparative Example 1

Compared with Example 3, a difference is that thiocarbamide was not added in step S1.

S1: preparation of antibacterial far-infrared ceramic powder: 11 g of tetrabutyl titanate, 4 g of zinc acetate, and 3 g of zirconium acetate were added to 500 mL ethanol, 0.7 g of polyvinyl alcohol was added, stirred and mixed for 20 minutes, 11 g of 2 mol/L hydrochloric acid solution was added dropwise, stirred and reacted for 4 hours, centrifuged, washed, dried, calcined at 500° C. for 2.5 hours, and ball milled for 1.5 hours to obtain the antibacterial far-infrared ceramic powder.

Comparative Example 2

Compared with Example 3, a difference is that step S2 was not performed. And it includes the following steps:

S1: preparation of doped antibacterial far-infrared ceramic powder: 11 g tetrabutyl titanate, 4 g zinc acetate, and 3 g zirconium acetate were added to 500 mL ethanol, 0.7 g polyvinyl alcohol and 0.3 g thiocarbamide were added, stirred and mixed for 20 minutes, 11 g 2 mol/L hydrochloric acid solution was added dropwise, stirred and reacted for 4 hours, centrifuged, washed, dried, calcined at 500° C. for 2.5 hours, and ball milled for 1.5 hours to prepare the doped antibacterial far-infrared ceramic powder;

S2: preparation of modified ceramic powder: 10 g of doped antibacterial far-infrared ceramic powder was added to 500 mL of water, 3.5 g of tannic acid and 0.7 g of catalyst were added, heated to 40° C., stirred for 3 hours, centrifuged, washed, and dried to obtain the modified ceramic powder; the catalyst is a Tris HCl solution with pH of 9;

S3: melt spraying: TPEE was added to a screw injection molding machine, heated to 210° C., melted and sprayed, stretched under an action of hot air, pulled by a stretching airflow, blown towards a drum, and collected on the drum, relying on its own thermal adhesion to synthesize TPEE air fiber membrane;

S4: preparation of the material for producing macromolecule air fibers: 8.5 g of carboxymethyl chitosan was dissolved in 500 ml of water, 2.5 g of modified ceramic powder was added, stirred and mixed for 10 minutes, immersed in 17 g of TPEE air fiber membrane, evenly dripped 10 g of 0.15 wt % Genipin solution, heated to 40° C., reacted for 1.5 hours, removed the membrane, washed, dried, and obtained the material for producing macromolecule air fibers.

Comparative Example 3

Compared with Example 3, a difference is that step S3 was not performed. And it includes the following steps:

S1: preparation of doped antibacterial far-infrared ceramic powder: 11 g tetrabutyl titanate, 4 g zinc acetate, and 3 g zirconium acetate were added to 500 mL ethanol, 0.7 g polyvinyl alcohol and 0.3 g thiocarbamide were added, stirred and mixed for 20 minutes, 11 g 2 mol/L hydrochloric acid solution was added dropwise, stirred and reacted for 4 hours, centrifuged, washed, dried, calcined at 500° C. for 2.5 hours, and ball milled for 1.5 hours to prepare the doped antibacterial far-infrared ceramic powder;

S2: preparation of magnetic doped antibacterial far-infrared ceramic powder: 11 g of doped antibacterial far-infrared ceramic powder was added to 500 ml of water; 3.24 g of ferric chloride and 1.26 g of ferrous chloride were added under nitrogen protection, and 5 g of ammonia water was added dropwise, heated to 75° C., stirred and reacted for 4 hours, centrifuged, washed, dried, and calcined at 450° C. for 1.5 hours to obtain the magnetic doped antibacterial far-infrared ceramic powder;

S3: melt spraying: TPEE was added to a screw injection molding machine, heated to 210° C., melted and sprayed, stretched under an action of hot air, pulled by a stretching airflow, blown towards a drum, and collected on the drum, relying on its own thermal adhesion to synthesize TPEE air fiber membrane;

S4: preparation of the material for producing macromolecule air fibers: 8.5 g of carboxymethyl chitosan was dissolved in 500 ml of water, 2.5 g of magnetic doped antibacterial far-infrared ceramic powder was added, stirred and mixed for 10 minutes, immersed in 17 g of TPEE air fiber membrane, evenly dropped 10 g of 0.15 wt % Genipin solution, heated to 40° C., reacted for 1.5 hours, removed the membrane, washed, dried, and prepared the material for producing macromolecule air fibers.

Comparative Example 4

Compared with Example 3, a difference is that no modified ceramic powder was added in step S5.

S5: preparation of the material for producing macromolecule air fibers: 8.5 g of carboxymethyl chitosan was dissolved in 500 ml of water, stirred and mixed for 10 minutes, immersed in 17 g of TPEE air fiber membrane, evenly dripped 10 g of 0.15 wt % Genipin solution, heated to 40° C., react for 1.5 hours, removed the membrane, washed, dried, and prepared the material for producing the macromolecule air fibers.

Comparative Example 5

Compared with Example 3, a difference is that carboxymethyl chitosan was not added in step S5.

S5: preparation of the material for producing macromolecule air fibers: 2.5 g of modified ceramic powder was added to 500 ml of water, stirred and mixed for 10 minutes, immersed in 17 g of TPEE air fiber membrane, heated to 40° C., reacted for 1.5 hours, removed the membrane, washed, dried, and prepared the material for producing macromolecule air fibers.

Test Example 1

The materials for producing macromolecule air fibers prepared in Examples 1-3 and Comparative Examples 1-5 were tested using the oscillation method (GB/T20944.3-2008).

Test bacteria: *Escherichia coli* ATCC25922, *Staphylococcus aureus* ATCC6538.

The results are shown in Table 1.

TABLE 1

| Groups | Antibacterial rate of *Escherichia coli* (%) | Antibacterial rate of *Staphylococcus aureus* (%) |
|---|---|---|
| Example 1 | >99.99 | >99.99 |
| Example 2 | >99.99 | >99.99 |
| Example 3 | >99.99 | >99.99 |
| Comparative example 1 | 91.92 | 89.42 |
| Comparative example 2 | 93.21 | 91.08 |
| Comparative example 3 | 90.85 | 88.51 |
| Comparative example 4 | 85.62 | 83.98 |
| Comparative example 5 | 89.54 | 87.17 |

As shown in the table above, the materials for producing macromolecule air fibers prepared in Examples 1-3 of the present disclosure have good antibacterial properties.

Test Example 2

The materials for producing macromolecule air fibers prepared in Examples 1-3 and Comparative Examples 1-5 of the present disclosure were used as a support layer of mattress, with a thickness of 6 cm and a density of 55 kg/m$^3$. Sponge was used as a cushion layer, with a thickness of 4 cm and a density of 20 kg/cm$^3$. Cotton cloth was used as a surface layer to prepare the mattress, and the tests were conducted.

The thermal comfort testing instrument is an American iBtton temperature recorder, with specific parameters as follows: temperature measurement range of −35 to 70° C., sampling speed of 1 time/min, sampling resolution of 0.5° C., and accuracy of ±0.5° C. Before testing, the mattress needs to be placed in an environment with room temperature of (23±0.5° C.) and relative humidity of (50±5) % for 24 hours. Four parts of a human body that come into contact with the mattress when lying down are selected as testing points, namely the back. A thin breathable tape is used to attach the temperature recorder to a surface of a bed sheet at the testing points, and the experiment is started after the indoor environment meets the experimental conditions. Each experiment lasts for 30 minutes. After data collection is completed, analyze it. The overall interface temperature is calculated from the local interface temperature. During the experiment, subjective temperature perception and subjective thermal comfort evaluation tests were conducted on the subjects, and the average value was taken. The subjective temperature perception evaluation scale is shown in Table 2, and the subjective comfort evaluation scale is shown in Table 3.

TABLE 2

Subjective Temperature Perception Evaluation Scale

| Grade | −3 | −2 | −1 | 0 | 1 | 2 | 3 |
|---|---|---|---|---|---|---|---|
| Feeling | Very cold | Cold | Cool | Moderate | Warm | Hot | Very hot |

TABLE 3

Subjective Thermal Comfort Evaluation Scale

| Grade | −3 | −2 | −1 | 0 | 1 | 2 | 3 |
|---|---|---|---|---|---|---|---|
| Feeling | Very comfortable | More comfortable | Comfortable | Common | Uncomfortable | More uncomfortable | Very uncomfortable |

The results of back temperature changes are shown in Table 4.

TABLE 4

Back Temperature Change Table

| Groups | Time 10 min | 20 min | 30 min |
|---|---|---|---|
| Example 1 | 30 | 31 | 32 |
| Example 2 | 29 | 31 | 31 |
| Example 3 | 29 | 30 | 32 |
| Comparative example 1 | 25 | 25 | 26 |
| Comparative example 2 | 24 | 24 | 25 |
| Comparative example 3 | 23 | 23 | 24 |
| Comparative example 4 | 21 | 22 | 22 |
| Comparative example 5 | 28 | 29 | 30 |

As shown in the table above, the temperature of the mattress prepared from the materials for producing macromolecule air fibers in Examples 1-3 of the present disclosure is higher and more suitable.

The scoring results are shown in Table 5.

TABLE 5

| Groups | Subjective temperature rating | Subjective thermal comfort rating |
|---|---|---|
| Example 1 | 0.25 | −2.10 |
| Example 2 | 0.27 | −2.07 |
| Example 3 | 0.22 | −2.15 |
| Comparative example 1 | 0.10 | −1.74 |
| Comparative example 2 | 0.12 | −1.89 |
| Comparative example 3 | −0.14 | −0.52 |
| Comparative example 4 | −1.54 | 1.58 |
| Comparative example 5 | −1.07 | 1.17 |

From the above table, it can be seen that the subjective temperature of the mattress prepared from the materials for producing macromolecule air fibers in Examples 1-3 of the present disclosure is moderate and more comfortable.

Test Example 3

The materials for producing macromolecule air fibers prepared in Examples 1-3 and Comparative Examples 1-5 of the present disclosure were used as the support layer of the mattress, with a thickness of 6 cm and a density of 55 kg/m$^3$. Sponge was used as the cushion layer, with a thickness of 4 cm and a density of 20 kg/cm$^3$. Cotton cloth was used as the surface layer to prepare the mattress and, a test was conducted.

This experiment uses the MCK-Z-I intelligent display controller to measure a force displacement curve of mattress samples. Conducted in an environment with room temperature (23±2° C.) and relative humidity (50±5) %. Before the experiment, a pressure plate is raised and the mattress samples are placed on the experimental table, the position of the pressure plate is adjusted to be exactly in centers of the mattress samples. During the experiment, sinking amounts of the mattress samples at 110N were measured, three measurements were conducted, and the average was taken, and a comprehensive stiffness K value of the mattress sample was calculated. The K value is proportional to a hardness of the mattress. The larger the comprehensive stiffness K value is, the harder the mattress is; and the smaller the comprehensive stiffness K value is, the softer the mattress is.

The results are shown in Table 6.

TABLE 6

| Groups | Comprehensive stiffness K value |
|---|---|
| Example 1 | 4.56 |
| Example 2 | 4.55 |
| Example 3 | 4.59 |
| Comparative example 1 | 4.53 |
| Comparative example 2 | 4.51 |
| Comparative example 3 | 4.45 |
| Comparative example 4 | 4.07 |
| Comparative example 5 | 4.20 |

From the above table, it can be seen that the mattresses prepared from the materials for producing macromolecule air fibers in Examples 1-3 of the present disclosure have better comprehensive stiffness K values.

The above description is only a preferred embodiment of the present disclosure and is not intended to limit the present disclosure. Any modifications, equivalent substitutions, improvements, etc. made within the spirit and principles of the present disclosure should be included within the protection scope of the present disclosure.

What is claimed is:

1. A preparation method for a material for producing macromolecule air fibers, comprising the following steps:

S1: preparation of doped antibacterial far-infrared ceramic powder: adding tetrabutyl titanate, zinc acetate, and zirconium acetate to ethanol, adding polyvinyl alcohol and thiocarbamide, stirring and mixing evenly, adding hydrochloric acid dropwise, stirring and reacting, centrifuging, washing, drying, calcining, and ball milling to obtain the doped antibacterial far-infrared ceramic powder;

S2: preparation of magnetic doped antibacterial far-infrared ceramic powder: adding the doped antibacterial far-infrared ceramic powder to water, adding ferric chloride and ferrous chloride under inert gas protection, adding ammonia water dropwise, heating, stirring and reacting, centrifuging, washing, drying, and calcining to obtain the magnetic doped antibacterial far-infrared ceramic powder;

S3: preparation of modified ceramic powder: adding the magnetic doped antibacterial far-infrared ceramic powder to water, adding tannic acid and catalyst, heating, stirring and reacting, separating by magnet, washing, drying to obtain the modified ceramic powder;

S4: melt spraying: adding TPEE to a screw injection molding machine, heating, melting and spraying, and then stretching under an action of hot air, after being pulled by a stretching airflow, blown towards a drum and collected on the drum, and synthesized into TPEE air fiber membrane by its own thermal adhesion;

S5: preparation of the material for producing macromolecule air fibers: dissolving water-soluble chitosan in water, adding the modified ceramic powder, stirring and mixing evenly, immersing in the TPEE air fiber membrane, evenly dropping Genipin solution, heating and reacting, removing the membrane, washing, drying, and preparing the membrane as the material for producing macromolecule air fibers.

2. The preparation method according to claim 1, wherein a mass ratio of tetrabutyl titanate, zinc acetate, zirconium acetate, polyvinyl alcohol, and thiocarbamide in step S1 is 10-13:3-5:2-4:0.5-1:0.2-0.4, the hydrochloric acid has a concentration of 1.5-2.5 mol/L;

a temperature of the calcining is 400-600° C., and a time of the calcining is 2-3 hours;

a time for the ball milling is 1-2 hours.

3. The preparation method according to claim 1, wherein a mass ratio of the doped antibacterial far-infrared ceramic powder, ferric chloride, ferrous chloride, and ammonia water in step S2 is 10-12:3.24:1.26:4-6;

a temperature of the heating, stirring and reacting is 70-80° C., and a time of the heating, stirring and reacting is 3-5 hours;

a temperature of the calcining is 400-500° C., and a time of the calcining is 1-2 hours.

4. The preparation method according to claim 1, wherein a mass ratio of the magnetic doped antibacterial far-infrared ceramic powder, tannic acid and catalyst in step S3 is 10:3-4:0.5-1, the catalyst is a Tris HCl solution with a pH of 8.5-9.5;

a temperature of the heating, stirring and reacting is 35-45° C., and a time of the heating, stirring and reacting is 2-4 hours.

5. The preparation method according to claim 1, wherein a temperature of the melting in step S4 is 205-215° C.

6. The preparation method according to claim 1, wherein in step S5, the water-soluble chitosan is carboxymethyl chitosan or chitosan hydrochloride;

a mass ratio of the water-soluble chitosan, modified ceramic powder, and TPEE air fiber membrane is 7-10:2-3:15-20, the Genipin solution has a concentration of 0.1-0.2 wt %;

a temperature of the heating and reacting is 35-45° C., and a time of the heating and reacting is 1-2 hours.

7. The preparation method according to claim 1, comprises the following steps:

S1: preparation of doped antibacterial far-infrared ceramic powder: adding 10-13 parts by weight of tetrabutyl titanate, 3-5 parts by weight of zinc acetate, and 2-4 parts by weight of zirconium acetate to ethanol, adding 0.5-1 parts by weight of polyvinyl alcohol and 0.2-0.4 parts by weight of thiocarbamide, stirring and mixing evenly, adding 10-12 parts by weight of 1.5-2.5 mol/L hydrochloric acid solution dropwise, stirring and reacting for 3-5 hours, centrifuging, washing, drying, calcining at 400-600° C. for 2-3 hours, ball milling for 1-2 hours to prepare the doped antibacterial far-infrared ceramic powder;

S2: preparation of magnetic doped antibacterial far-infrared ceramic powder: adding 10-12 parts by weight of doped antibacterial far-infrared ceramic powder to water, adding 3.24 parts by weight of ferric chloride and 1.26 parts by weight of ferrous under inert gas protection, adding 4-6 parts by weight of ammonia water dropwise, heating to 70-80° C., stirring for 3-5 hours, centrifuging, washing, drying, and calcining at 400-500° C. for 1-2 hours to prepare the magnetic doped antibacterial far-infrared ceramic powder;

S3: preparation of modified ceramic powder: adding 10 parts by weight of magnetic doped antibacterial far-infrared ceramic powder to water, adding 3-4 parts by weight of tannic acid and 0.5-1 parts by weight of catalyst, heating to 35-45° C., stirring for 2-4 hours, separating by magnet, washing, and drying to obtain the modified ceramic powder;

wherein the catalyst is a Tris HCl solution with a pH of 8.5-9.5;

S4: melt spraying: adding TPEE to a screw injection molding machine, heating to 205-215° C., melting and spraying, stretching under an action of hot air, after being pulled by a stretching airflow, blown towards a drum, and collected on the drum, then synthesized into TPEE air fiber membrane by its own thermal adhesion;

S5: preparation of the material for producing macromolecule air fibers: dissolving 7-10 parts by weight of water-soluble chitosan in water, adding 2-3 parts by weight of the modified ceramic powder, stirring and mixing evenly, immersing 15-20 parts by weight of the TPEE air fiber membrane, evenly dripping 10 parts by weight of 0.1-0.2 wt % Genipin solution, heating to 35-45° C., reacting for 1-2 hours, removing the membrane, washing, drying, and preparing the membrane as the material for producing macromolecule air fibers.

8. A material for producing macromolecule air fibers prepared by the preparation method according to of claim 1.

9. A mattress comprising the material for producing macromolecule air fibers according to claim 8.

* * * * *